(12) United States Patent
Naka

(10) Patent No.: US 6,415,391 B1
(45) Date of Patent: *Jul. 2, 2002

(54) CONTROL METHOD AND SYSTEM FOR RESETTING BACKUP DATA

(75) Inventor: Yoshihiro Naka, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/532,886

(22) Filed: Sep. 22, 1995

(30) Foreign Application Priority Data

Sep. 22, 1994 (JP) .............................. 6-227651

(51) Int. Cl.[7] ................................................ G06F 11/00
(52) U.S. Cl. .............................. 714/21; 714/22; 714/24
(58) Field of Search ............................. 714/23, 22, 15, 714/21, 29

(56) References Cited

U.S. PATENT DOCUMENTS

| 4,587,640 A | * | 5/1986 | Saitoh ..................... 395/182.2 |
| 4,658,352 A | * | 4/1987 | Nagasawa ................. 395/182.2 |
| 4,777,626 A | * | 10/1988 | Matsushita et al. ....... 395/182.2 |
| 5,007,027 A | * | 4/1991 | Shimoi ....................... 365/229 |
| 5,027,328 A | * | 6/1991 | Nakashima ................. 365/226 |
| 5,311,441 A | * | 5/1994 | Tayama et al. ........... 395/182.2 |
| 5,321,663 A | * | 6/1994 | Nishi .......................... 365/229 |
| 5,367,665 A | * | 11/1994 | Koch et al. ............. 395/182.21 |
| 5,396,637 A | * | 3/1995 | Harwell et al. .......... 395/182.2 |
| 5,408,648 A | * | 4/1995 | Gokan et al. ............. 395/182.2 |
| 5,522,034 A | * | 5/1996 | Watari et al. ............. 395/182.2 |

* cited by examiner

Primary Examiner—Scott Baderman
(74) Attorney, Agent, or Firm—Sughrue Mion, PLLC

(57) ABSTRACT

A backup control system comprises a control package, a file package including a battery monitor and a flip-flop circuit, and a back board having a return wire which provides connection/disconnection of the monitor terminal of the monitor. The monitor checks a voltage of the monitor terminal at all times and outputs a reset signal to the flip-flop circuit when the voltage of the monitor terminal becomes lower than a reference voltage. The return wire connects the monitor terminal to the power line when the file package is connected to the connection board, and disconnects the monitor terminal from the power line when the file package is removed from the connection board. The flip-flop circuit stores one of a set state and a reset state, and changes in state from the set state to the reset state when the reset signal is received from the monitor.

20 Claims, 6 Drawing Sheets

CONTROL METHOD AND SYSTEM FOR RESETTING BACKUP DATA

BACKGROUND OF THE INVENTION

1. Field of the Invention

The present invention relates to a system for backing up setting data of a plurality of circuit packages and, more specifically, to a backup method and system in a control system having a detachable backup memory.

2. Description of the Related Art

In general, a transmission apparatus in a switching system has a number of circuit packages (built-in circuit boards) which are detachably mounted on the backboard of the apparatus frame. This type of transmission apparatus further has a file package including a backup memory which stores start-up setting data such as a line connections state and a soft strap setting state of the transmission apparatus. When a communication service of the switching system is stopped due to, for instance, power shutoff, the communication service can be restored in a short time by using the start-up setting data stored in the backup memory.

FIG. 1 is a schematic block diagram showing a conventional control system having such a file package. A control package 10, a host supervisory/controlling apparatus (i.e., a central control apparatus) 20, a plurality of circuit packages 30 to be set, and a file package 40 are connected to each other via a backboard. Each of the circuit packages 10, 30 and 40 are detachably mounted by means of a connector. The control package 10 includes a processor 11 for controlling the circuit packages 30, an parallel I/O interface 12 for data communication with external systems, and interfaces for data communication with the host supervisory/controlling apparatus 20 and the packages 30 to be set. The file package 40 includes a backup memory 41 for storing start-up setting data, a battery 42 for supplying power to the backup memory 41, and a mode setting switch 43 that indicates whether there has occurred replacement work on the file package 40.

In the transmission apparatus having the above configuration, an operation of replacing a faulty circuit package with a new one or the same circuit package in another transmission apparatus is performed manually. In such an operation, there occurs no problem in replacing the control package 10 or the package 30 to be set. However, since the file package 40 stores data to be set in the associated transmission apparatus, a file package that has already been used in another transmission apparatus cannot be used for replacement as it is.

Therefore, a certain availability checking means is needed which allows the processor 11 of the control package 10 to recognize whether the start-up setting data stored in the file package 40 is available. In the above conventional apparatus, the mode setting switch 43 is provided as an availability checking means and a switching operation therefor is performed manually. More specifically, in restarting the apparatus, the processor 11 of the control package 10 checks the state of the mode setting switch 43. If the mode setting switch 43 is on, the processor 11 judges that the file package 40 is a substituted one. Thus, the processor 11 initializes the backup memory 41, starts up the apparatus, and stores start-up setting data of the respective packages into the backup memory 41. Upon completion of the restart of the apparatus, an operator switches the mode setting switch 43 to the off state. On the other hand, if the mode setting switch 43 is off in restarting the apparatus, the processor 11 judges that the file package 40 is not a substituted one. Thus, the processor 11 reads the start-up setting data from the backup memory 41, and restarts the apparatus.

A description will be made of another general availability checking means. First, in mounting the control package 10 and the file package 40, a particular pattern that was determined when the transmission apparatus was designed is stored into the backup memory 41. When the apparatus is restored from a power shutoff state, the processor 11 reads a pattern from the backup memory 41, and judges availability of the data stored in the backup memory 41 based on whether the readout pattern is the preset particular pattern.

However, in the conventional system in which the mode setting switch 43 is operated manually, it cannot be checked whether the start-up setting data stored in the backup memory 41 is available. Further, an operator is required to be present until completion of restarting. Since there are many packages to be set, it is very difficult to improve the working efficiency. Further, it is virtually impossible to be free of careless mistakes.

While the availability checking method using the particular pattern can check whether the file package 40 is the same one, it cannot check the start-up setting data of the backup memory 41 is available. This is so because even if the file package 40 is the same, a possibility is not denied that during power shutoff the file package 40 was used in another transmission apparatus and the data was written.

As described above, in the conventional system, it cannot be checked whether the start-up setting data stored in the backup memory was changed while the system was stopped. Therefore, for instance, when the power is shut off for maintenance and inspection, or the like, it is not completely assured that the same start-up setting data is stored. In particular, if a transmission apparatus in a switching system is restarted with start-up setting data of another transmission apparatus, a wrong connection state is established in the transmission apparatus concerned, causing too large influences on society. Therefore, there exists a problem that the apparatus cannot be restarted automatically when it is restored from a power shutoff state, for instance.

SUMMARY OF THE INVENTION

An object of the present invention is to provide a control system which can positively judge whether data stored in a backup memory is the same as the previous data, when the apparatus is restarted.

Another object of the invention is to provide a method and system which can automatically restart an apparatus having a backup memory.

A further object of the invention is to provide a circuit package including a backup memory in which, when the apparatus is restarted, a control package can positively judge whether data stored in the backup memory is the same as the previous data.

A backup memory package according to the present invention is detachably connected to a control system by means of a connection board. The control system is comprised a plurality of circuit packages detachably connected to the connection board, each circuit package requiring start-up setting data for start-up operation. The backup memory package is comprised of a battery for supplying power to the backup memory package through a power line and a backup memory for storing the start-up setting data.

The backup memory package is further provided with a battery monitor, a connection/disconnection member, and a flag memory. The monitor checks a voltage of a monitor input terminal at all times and generates a reset signal when the voltage of the monitor input terminal becomes lower than a predetermined reference voltage. The connection/ disconnection member connects the monitor input terminal to the power line when the backup memory package is connected to the connection board, and disconnects the monitor input terminal from the power line when the backup memory package is removed from the connection board. The flag memory stores one of a set state and a reset state, and changes in state from the set state to the reset state when the reset signal is received from the monitor.

The control package controls the circuit packages and the backup memory package through the connection board, and determines whether the start-up setting data stored in the backup memory is valid or not, by checking the flag state of the flag memory, set or reset.

More specifically, the connection/disconnection member comprises a first connector and a second connector. The first connector is provided in the backup memory package, having a plurality of conductors for electrically connecting the backup memory package to the connection board. Two conductors thereof are connected to the power line and the monitor input terminal, respectively. The second connector is provided in the connection board detachably connected to the first connector. The second connector has a plurality of conductors corresponding to those of the first connector, two conductors thereof corresponding to the two conductors of the first connector are connected to each other, forming a return wire.

The monitor monitors a voltage of the battery through the power line and the connection/disconnection member when the backup memory package is connected to the connection board. The monitor outputs the reset signal to the flag memory when the backup memory package is removed from the connection board or when a voltage of the battery becomes lower than the predetermined reference voltage. The predetermined reference voltage is preferably set higher than a minimum voltage that assures holding of data stored in the backup memory and the flag memory.

DETAILED DESCRIPTION OF THE PREFERRED EMBODIMENT

Figure 1:
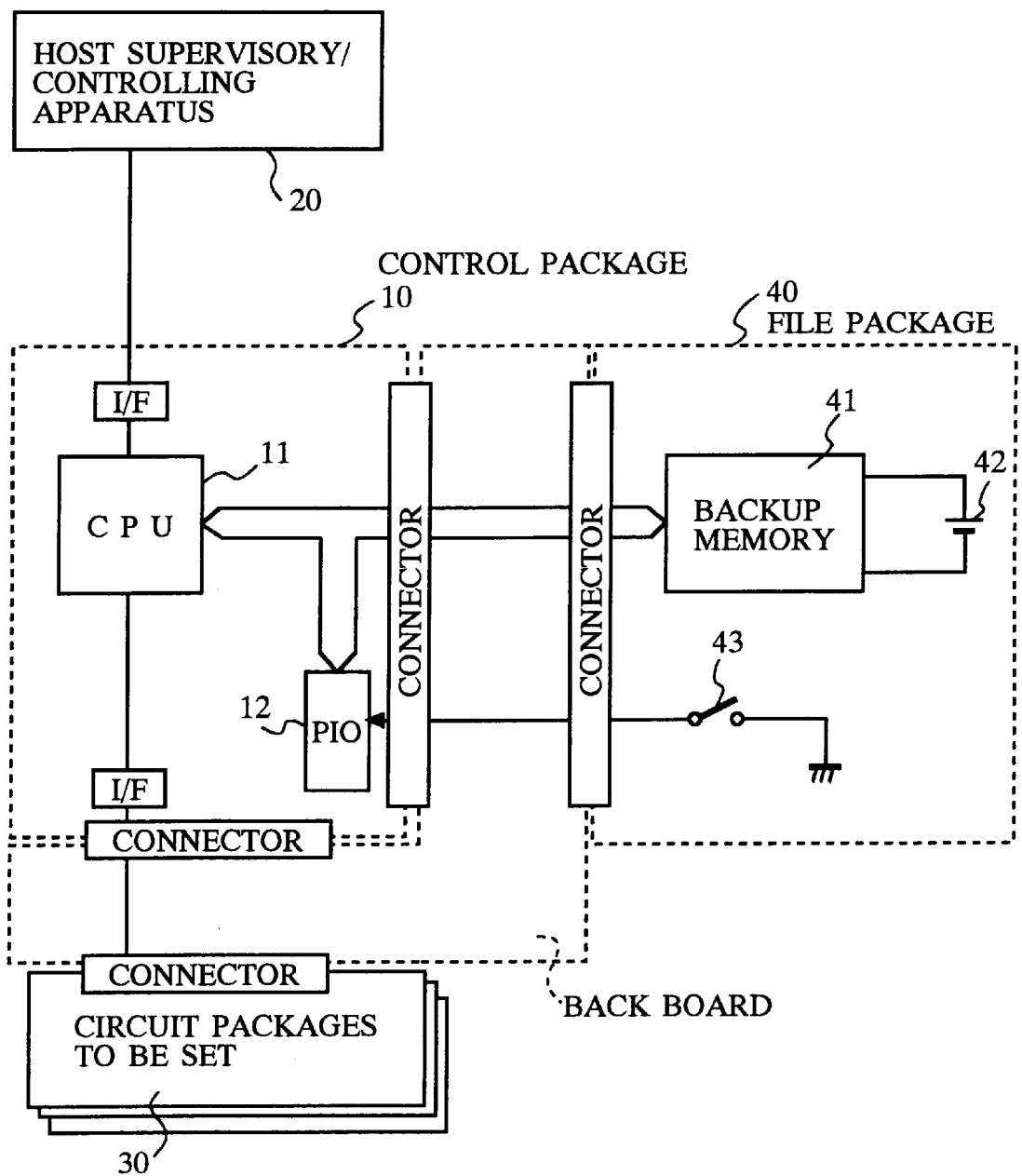
FIG. 1 is a schematic diagram showing an example of a conventional control system.
Figure 2:
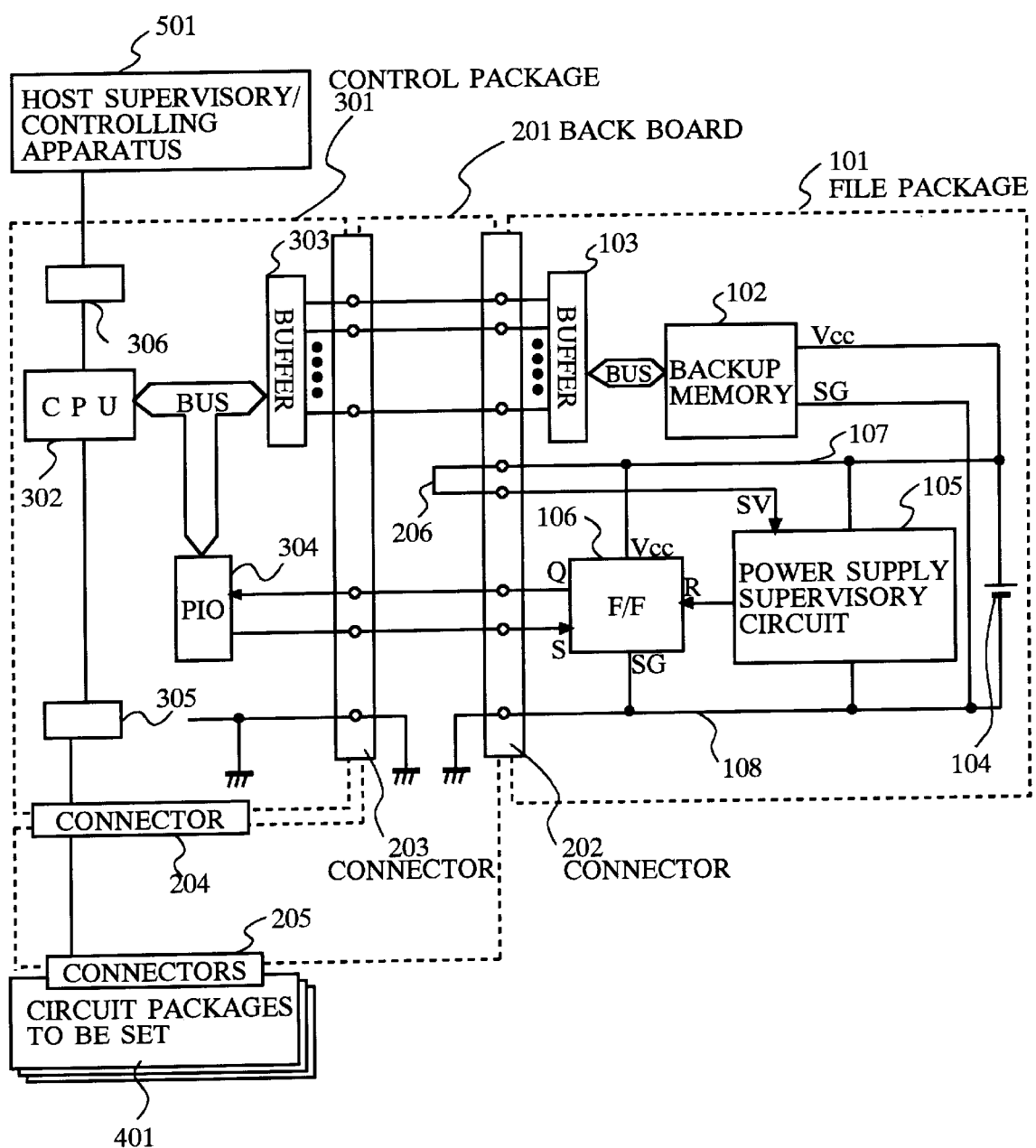
FIG. 2 is a block diagram showing a control system according to an embodiment of the present invention.

Referring to FIG. 2, a file package 101 is detachably connected to a backboard 201 via a connector 202, and a control package 301 is detachably connected to the backboard 201 via connectors 203 and 204. A plurality of circuit packages 401 to be set are detachably connected to the backboard 201 via respective connectors 205, which are connected to the connector 204 via the backboard 201. The control package 301 is connected to a host supervisory/controlling apparatus 501.

The file package 101 has a backup memory 102 which stores start-up setting data that are necessary to start up the packages 401 to be set. A data bus, an address bus, and a control bus of the backup memory 102 are connected to the connector 202 via a bus buffer 103. A backup battery 104 supplies power to the backup memory 102, a power monitoring circuit 105 and a flip-flop circuit 106 via a power line 107. The power line 107 is also connected to the connector 202, and is returned to the file package 101 via a return wire 206 (located in the backboard 201) and connected to a monitoring terminal SV of the power monitoring circuit 105. Therefore, if the file package 101 is pulled off from the backboard 201, the power line 107 and the power monitoring terminal SV of the power monitoring circuit 105 are necessarily disconnected electrically from each other.

The power monitoring circuit 105 always monitors a voltage Vcc of the battery 104 via the power line 107 and the return wire 206. If the power supply voltage Vcc becomes lower than a predetermined voltage, the power monitoring circuit 105 supplies a reset signal to the flip-flop circuit 106. This signal may be thought of as a disconnection signal. Since the power monitoring circuit 105 monitors the power supply voltage Vcc via the power line 107 and the return wire 206, the voltage applied to the monitoring terminal SV quickly decreases from Vcc when the file package 101 is pulled off from the backboard 201. Therefore, the power monitoring circuit 105 can detect not only voltage reduction of the battery 104 but also pulling off of the file package 101 from the backboard 201. Thus, monitor 105 and connector 202 may be thought of as cooperating to form a disconnection detector.

The reset terminal (R) of the flip-flop circuit 106 is connected to the power monitoring circuit 105, and its set terminal (S) and output terminal (Q) are connected to the connector 202. A grounding line 108 is connected to the connector 202 and grounded in the backboard 201.

The control package 301 has a processor 302 for controlling the packages 401 to be set. A data bus, an address bus, and a control bus of the processor 302 are connected to the connector 203 via a bus buffer 303. The bus buffer 303 of the control package 301 and the bus buffer 103 of the file package 101 are connected to each other via the backboard 201 and the connectors 202 and 203, whereby the processor 302 and the backup memory 102 are connected to each other via the buses.

A parallel input/output (PIO) circuit 304 is connected to the processor 302 via the bus. A one-bit output terminal of the PIO circuit 304 is connected to the set terminal (S) of the flip-flop circuit 106 of the file package 101 via the connectors 202 and 203. On the other hand, the output terminal (Q) of the flip-flop circuit 106 is connected to a one-bit input terminal of the PIO circuit 304 via the connectors 202 and 203. Therefore, the processor 302 can set the flip-flop circuit 106 of the file package 101 through the PIO circuit 304, and can also check its output state.

Through an interface circuit 305 of the apparatus, the processor 302 can transmit the start-up setting data to the packages 401 to be set, and perform supervision and control of their setting states. Further, the processor 302 communicates with a host supervisory/controlling apparatus 501 through a communication circuit 306.

Figure 3:
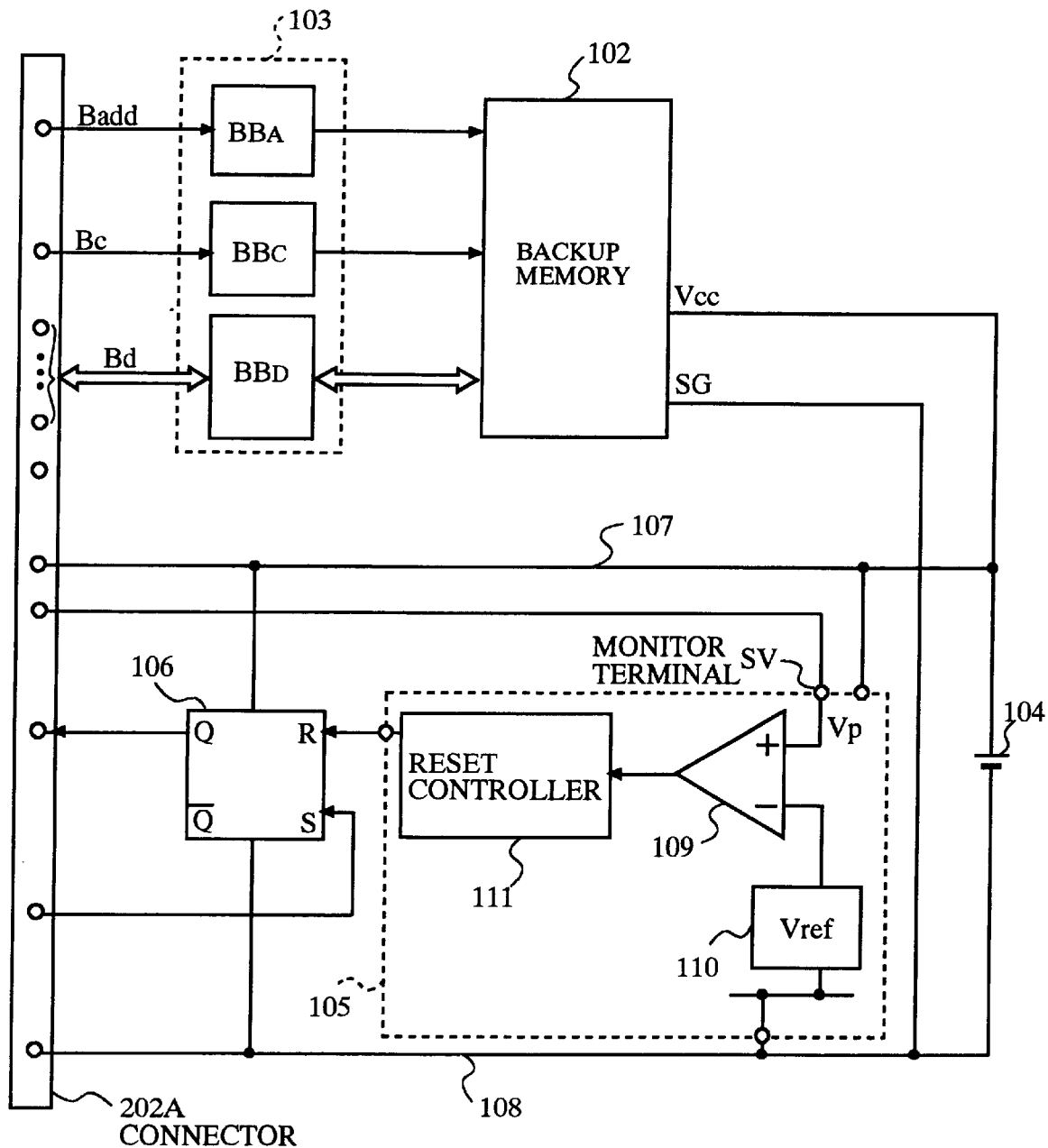
FIG. 3 is a block diagram showing a more detailed configuration of a file package in the embodiment.

As shown in a detailed manner in FIG. 3, the file package 101 has a connector 202A for connection to the backboard 201, and the return wire is not provided in the connector 202A. Therefore, in a state that the file package 101 is removed from the backboard 201, the power line 107 of the file package 101 and the monitoring terminal SV of the power monitoring circuit 105 are disconnected from each other. The bus buffer 103, which is comprised of unidirectional address bus buffer $BB_A$ and control bus buffer $BB_C$ and a bi-directional data bus buffer $BB_D$, connects pins of the connector 202A and input/output terminals of the backup memory 102.

The power monitoring circuit 105 is comprised of a voltage comparator 109, a reference voltage generator 110, and a reset controller 111. The voltage comparator 109 compares a voltage $V_P$ that is applied to the monitoring terminal SV with a reference voltage $V_{ref}$. If the monitoring voltage $V_P$ becomes lower than the reference voltage $V_{ref}$, the comparator 109 supplies a low-level voltage to the reset controller 111. The reference voltage $V_{ref}$ is set higher than a minimum voltage that assures holding of data stored in the backup memory 102 and the flip-flop circuit 106.

Upon receiving the low-level voltage from the comparator 109, the reset controller 111 supplies a reset signal to the reset terminal (R) of the flip-flop circuit 106, to reset it. As described above, when the file package 101 is removed from the backboard 201 or the voltage Vcc of the battery 104 decreases, the voltage comparator 109 supplies the low-level voltage to the reset controller 106.

Start-Up Operation

When the file package 101 and the packages 401 to be set are mounted on the backboard 201, the processor 302 of the control package 301 first execute a start-up process of the packages 401 to be set.

Figure 4:
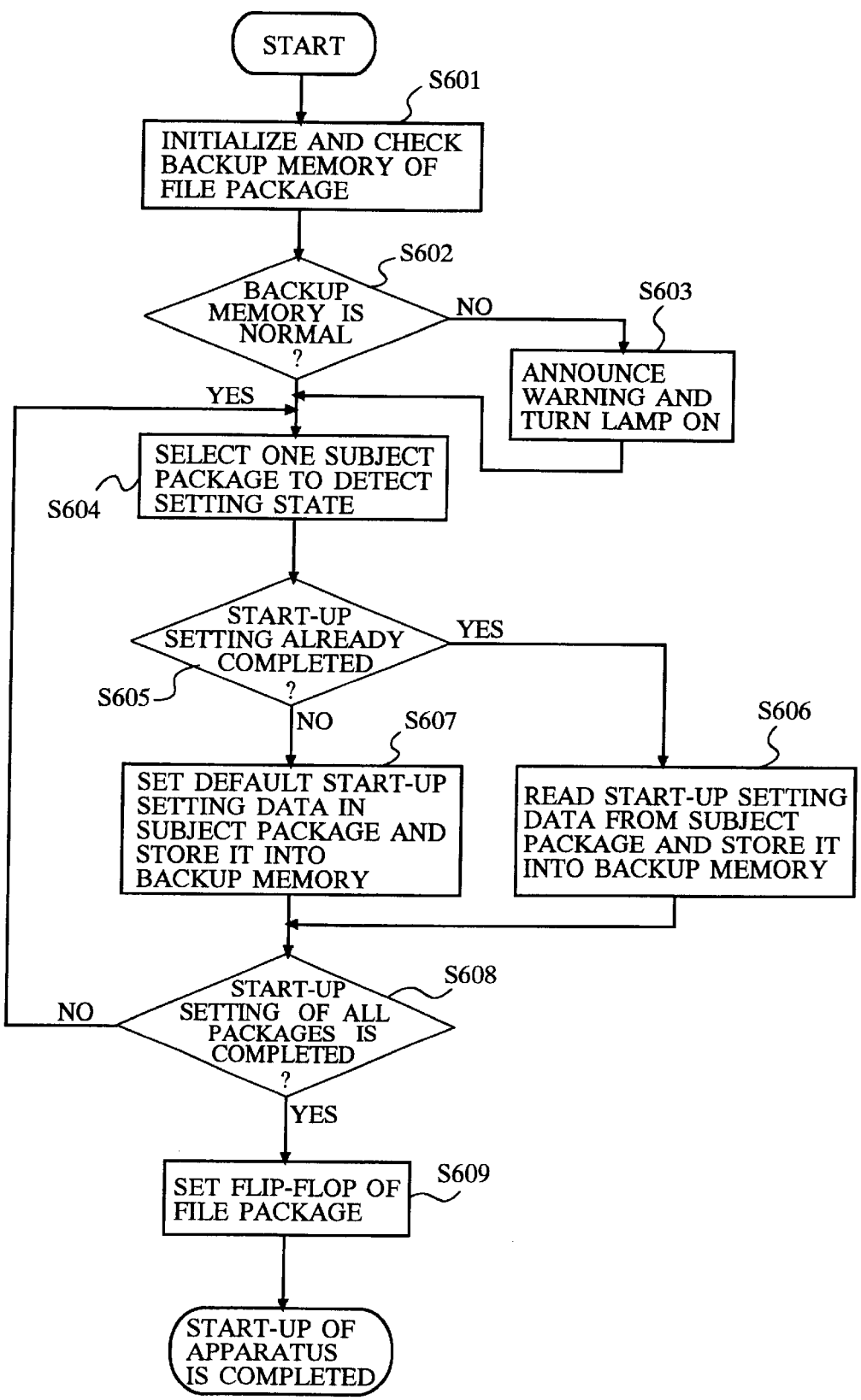
FIG. 4 is a flowchart showing a start-up control flow performed in the embodiment when the file package is mounted.

As shown in FIG. 4, the processor 302 initializes the backup memory 102 of the file package 101 and performs a memory check (S601). If abnormality is found in the memory check (No in S602), which means a failure of the file package 101, the processor 302 announces warning and turns on an abnormality lamp for the package 101 (S603). Recognizing the warning, an operator replaces the faulty file package 101 with a new one.

If the backup memory 102 is normal (Yes in S602), the processor 302 selects one subject package, and detects its setting state (S604). If start-up setting of the selected subject package has already been completed (Yes in S605), the processor 302 reads start-up setting data from the selected subject package and stores it into the backup memory 102 (S606). If the selected subject package has not been subjected to start-up setting (No in S605), the processor 302 sets the default start-up setting data in the selected subject package and, at the same time, stores that start-up setting data into the backup memory 102 (S607). Steps S604–S607 are repeated until all the packages 401 have been subjected to start-up setting (S608).

If all the packages have been subjected to start-up setting (Yes in S608), the processor 302 sets the flip-flop circuit 106 through the PIO circuit 304 (S609), to complete the start-up of the transmission apparatus.

Restart Operation

When the transmission apparatus that has been subjected to the start-up setting in the above manner is recovered from a power shutoff state due to, for instance, maintenance and inspection, the processor 302 restarts the apparatus according to the following steps.

Figure 5:
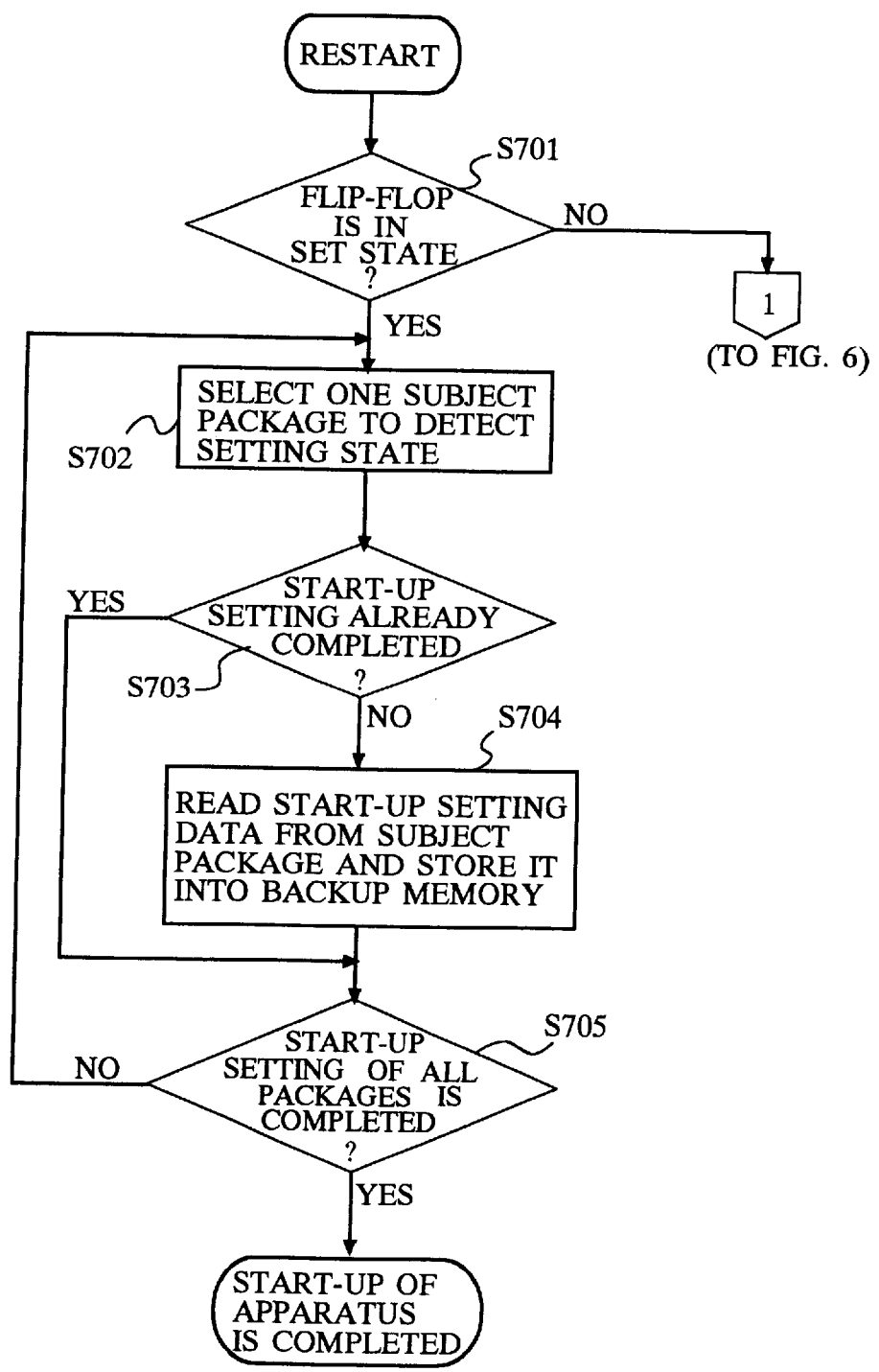
FIG. 5 is a flowchart showing a restart control flow performed in the embodiment when the file package is available.

As shown in FIG. 5, when the power is restored, the processor 302 first checks the state of the output terminal Q of the flip-flop circuit 106 of the file package 101 through the PIO 304 (S701). The set state of the flip-flop circuit 106 (Yes in S701) indicates that the file package 101 has never been pulled off from the backboard 201 nor the voltage of the battery 104 has decreased during the power shutoff. Therefore, the processor 302 can reset the transmission apparatus concerned using the start-up setting data stored in the backup memory 102.

The processor 302 selects one subject package, and detects its setting state (S702). If start-up setting of the selected subject package has already been completed (Yes in S703), it is checked whether all the packages 401 have been subjected to start-up setting (S705). If the selected subject package has not been subjected to start-up setting (No in S703), the processor 302 reads start-up data for the package concerned from the backup memory 102 of the file package 101, and installs it in the package concerned through the interface 305 (S704). Steps S702–S704 are repeated until all the packages 401 are subjected to start-up setting (S705). When all the packages 401 have been subjected to start-up setting (Yes in S705), the processor 302 restarts the transmission apparatus.

On the other hand, the reset state of the flip-flop circuit 106 (No in S701) indicates that, during power shutoff, the file package 101 has been replaced, it has been pulled off from the backboard 201, or the voltage of the battery 104 has decreased to a value smaller than the minimum voltage necessary to hold data of the memory. Therefore, the processor 302 cannot reset the transmission apparatus concerned using the start-up setting data stored in the backup memory 102.

Figure 6:
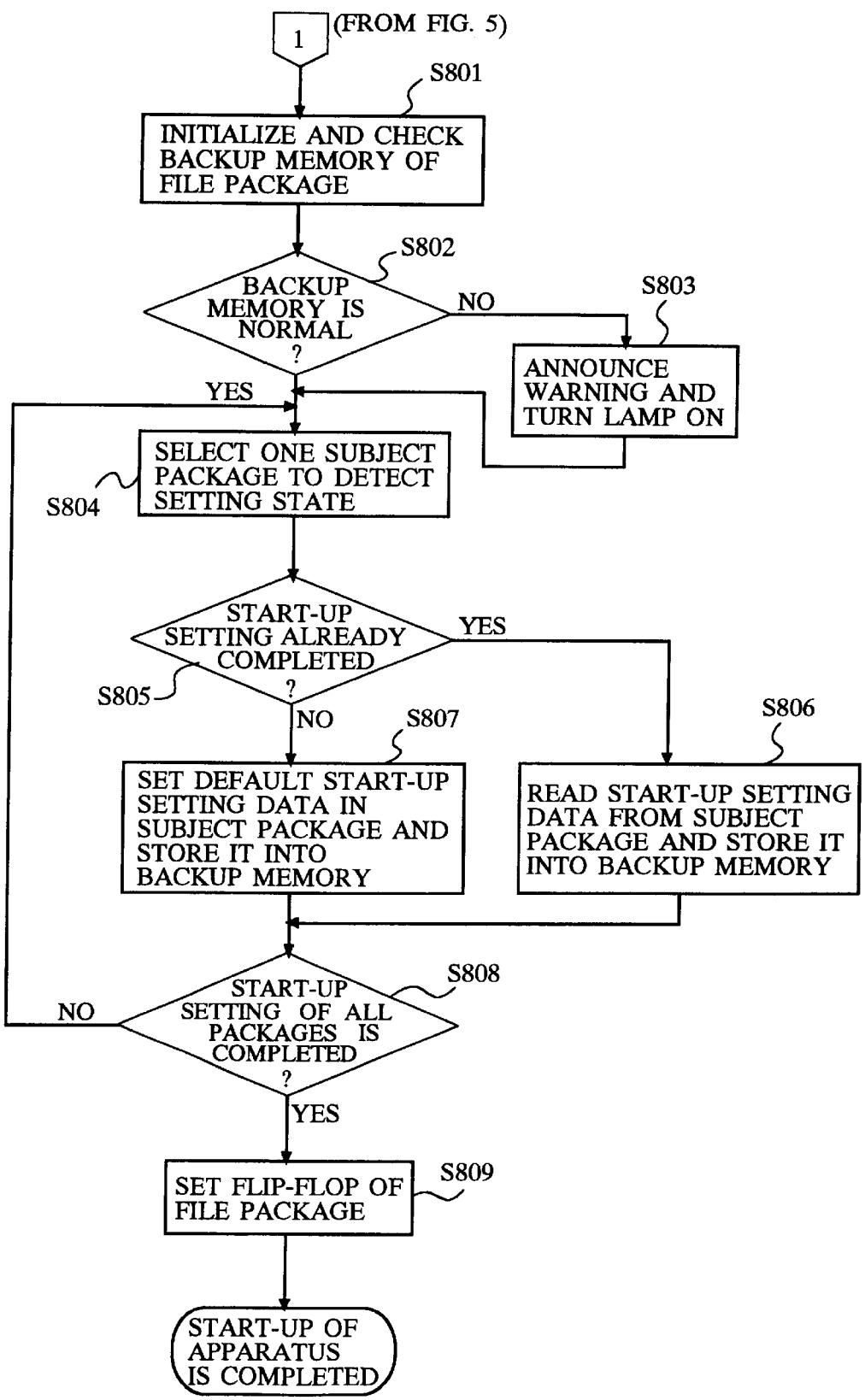
FIG. 6 is a flowchart showing a restart control flow performed in the embodiment when the file package is not available.

In this case, as shown in FIG. 6, the processor 302 executes a restart process by a start-up operation that is performed in mounting the file package 101 as shown in FIG. 4. More specifically, as shown in FIG. 6, the processor 302 initializes the backup memory 102 of the file package 101 and performs a memory check (S801). If abnormality is found in the memory check (No in S802), which means a failure of the file package 101, the processor 302 announces warning and turns on an abnormality lamp for the package 101 (S803). Recognizing the warning, an operator replaces the faulty file package 101 with a new one.

If the backup memory 102 is normal (Yes in S802), the processor 302 selects one subject package, and detects its setting state (S804). If start-up setting of the selected subject package has already been completed (Yes in S805), the processor 302 reads start-up setting data from the selected subject package and stores it into the backup memory 102 (S806). If the selected subject package has not been subjected to start-up setting (No in S805), the processor 302 sets the default start-up setting data in the selected subject package and, at the same time, stores that start-up setting data into the backup memory 102 (S807). Steps S604–S607 are repeated until all the packages 401 have been subjected to start-up setting (S808).

If all the packages have been subjected to start-up setting (Yes in S808), the processor 302 sets the flip-flop circuit 106 through the PIO circuit 304 (S809), to complete the start-up of the transmission apparatus.

According to the present invention, by checking the state of the flip-flop circuit of the file package, the control package can judge whether the file package has been removed. At the occurrence of file package replacement, the start-up data of the backup memory of the file package is judged to be not available. The power monitoring circuit of the file package always monitors the battery. When the battery voltage decreases, the power monitoring circuit resets the flip-flop circuit. Thus, at the occurrence of battery voltage reduction, the start-up setting data of the backup memory is judged to be not available.

Therefore, the control system according to the present invention can positively judge availability of the data stored in the backup memory of the file package that is connected to the control package and, for example, can automatically execute in a positive manner the operation of restarting the apparatus in restoring it from a power shutoff state.

What is claimed is:

1. A system comprising:
   a connection board;
   a plurality of circuit packages being detachably connected to said connection board, each of the plurality of circuit packages using start-up setting data for start-up operation;
   a first package detachably connected to the connection board and comprising:
      a backup memory for storing the start-up setting data,
      a disconnection detector for detecting disconnection of the first package from the connection board to produce a disconnection signal, and
      a state memory for storing one of a first state and a second state such that the second state is normally stored and is changed to the first state when the disconnection signal is produced; and
   a second package for controlling the plurality of circuit packages and the first package through the connection board, the second package being detachably connected to the connection board and comprising a controller for determining whether the start-up setting data stored in the backup memory is valid by checking which of the first state and the second state is stored in the state memory of the first package.

2. The system according to claim 1, further comprising:
   the first package having a battery for supplying power to a power line; and
   the disconnection detector comprising:
      a monitor monitoring a voltage of a monitor input terminal, the monitor generating the disconnection signal when the voltage of the monitor input terminal becomes lower than a predetermined reference voltage, and
      a connector connecting the monitor input terminal of the monitor to the power line when the first package is connected to the connection board, and disconnecting the monitor input terminal from the power line when the first package is removed from the connection board.

3. The system according to claim 1, wherein:
   the first package further comprises a battery for supplying power to a power line; and
   the disconnection detector comprises:
      a monitor monitoring a voltage of a monitor input terminal, the monitor generating the disconnection signal when the voltage of the monitor input terminal becomes lower than a predetermined reference voltages and
      a first connector having a first plurality of conductors for electrically connecting the first package to the connection board, the first plurality of conductors including a first conductor connected to the power line and a second conductor connected to the monitor input terminal of the monitor; and
   the connection board comprises a second connector having a second plurality of conductors and detachably connecting to the first connector, the second plurality of conductors of the second connector corresponding to the first plurality of conductors of the first connector, the respective second plurality of conductors including a third conductor corresponding to the first conductor and a fourth conductor corresponding to the second conductors the third and the fourth conductors being connected to each other.

4. The system according to claim 2, wherein the monitor monitors a voltage of the battery through the power line and the connector when the first package is connected to the connection board.

5. The system according to claim 3, wherein the monitor monitors a voltage of the battery through the power line and the first and second connectors when the first package is connected to the connection board.

6. The system according to claim 3, wherein the monitor generates the disconnection signal when the first package is removed from the connection board.

7. The system according to claim 2, wherein the predetermined reference voltage is higher than a minimum voltage that assures holding of data stored in the backup memory and the state memory.

8. The system according to claim 3, wherein the predetermined reference voltage is higher than a minimum voltage that assures holding of data stored in the backup memory and the state memory.

9. The system according to claim 1, wherein the state memory is a flip-flop circuit having a set terminal, a reset terminal and an output terminal, the reset terminal receiving the disconnection signal from the disconnection detector, and the output terminal indicating one of the first state and the second state.

10. A method for backing up setting data in a control system, the control system comprising
    a connection board;
    a plurality of circuit packages detachably connected to said connection board, each of the plurality of circuit packages using start-up setting data for start-up operation;
    a first package detachably connected to the connection board, the first package including a backup memory for storing the start-up setting data; and
    a second package for controlling the plurality of circuit packages and the first package through the connection board, the second package being detachably connected to the connection board;
    the method comprising the steps of:
    a) detecting disconnection of the first package from the connection board to produce a disconnection signal;
    b) storing one of a first state and a second state such that the second state is normally stored and is changed to the first state when the disconnection signal is produced; and
    c) determining whether the start-up setting data stored in the backup memory is valid depending on which of the first state and the second state is stored.

11. The method according to claim 10, wherein:
    the first package includes a battery for supplying power to a power line; and
    the step a) comprises:
       monitoring a voltage of a monitor terminal such that the disconnection signal is produced when the voltage of the monitor terminal becomes lower than a predetermined reference voltage:

connecting the monitor terminal to the power line when the first package is connected to the connection board; and disconnecting the monitor terminal from the power line when the first package is removed from the connection board.

12. The method according to claim 11, wherein said step a) further comprises monitoring a voltage of the battery through said power line when said first package is connected to the connection board.

13. The method according to claim 10, wherein the step a) comprises producing the disconnection signal when the first package is removed from the connection board.

14. The method according to claim 11, wherein the step a) comprises producing the disconnection signal when a voltage of the battery becomes lower than the predetermined reference voltage.

15. The method according to claim 11, further comprising a step of setting the predetermined reference voltage higher than a minimum voltage that assures holding of data stored in the first package.

16. A backup memory package detachably connected to a control system through a connection board, the control system controlling a plurality of circuit packages and the backup memory package through the connection board, each of the plurality of circuit packages using start-up setting data for start-up operation, the backup memory package comprising:

a backup memory for storing the start-up setting data;

a disconnection detector for detecting disconnection of the backup memory package from the connection board to produce a disconnection signal; and a state memory for storing one of a first state and a second state such that the second state is normally stored and is changed to the first state when the disconnection signal is produced.

17. The backup memory package according to claim 34, further comprising:

a battery for supplying power to a power line, and the disconnection detector comprising:

a monitor for monitoring a voltage of a monitor input terminal the monitor generating the disconnection signal when the voltage of the monitor input terminal becomes lower than a predetermined reference voltage; and a connector for connecting the monitor input terminal of the monitor to the power line when the first package is connected to the connection board, and for disconnecting the monitor input terminal from the power line when the first package is removed from the connection board.

18. The backup memory package according to claim 17, wherein, when the first package is connected to the connection board, the monitor monitors a voltage of the battery through the power line and the connector.

19. The backup memory package according to claim 17, wherein the predetermined reference voltage is higher than a minimum voltage that assures holding of data stored in the backup memory and the state memory.

20. The backup memory package according to claim 16, wherein:

the state memory is a flip-flop circuit having a set terminal, a reset terminal, and an output terminal;

the reset terminal receives the disconnection signal from the disconnection detector; and the output terminal indicates one of the first state and the second state.

* * * * *

UNITED STATES PATENT AND TRADEMARK OFFICE
CERTIFICATE OF CORRECTION

PATENT NO. : 6,415,391 B1
DATED : July 2, 2002
INVENTOR(S) : Yoshihiro Naka

It is certified that error appears in the above-identified patent and that said Letters Patent is hereby corrected as shown below:

<u>Title page,</u>
Item [*] Notice, delete "0" and insert -- 1150 --.

Signed and Sealed this

Thirtieth Day of August, 2005

JON W. DUDAS
*Director of the United States Patent and Trademark Office*